United States Patent
Takeda

(10) Patent No.: US 10,040,927 B2
(45) Date of Patent: Aug. 7, 2018

(54) RUBBER COMPOSITION FOR TIRES AND PNEUMATIC TIRE

(71) Applicant: The Yokohama Rubber Co., LTD., Manto-ku, Tokyo (JP)

(72) Inventor: Shinya Takeda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/319,748

(22) PCT Filed: Jun. 16, 2015

(86) PCT No.: PCT/JP2015/067299
§ 371 (c)(1),
(2) Date: Dec. 16, 2016

(87) PCT Pub. No.: WO2015/194549
PCT Pub. Date: Dec. 23, 2015

(65) Prior Publication Data
US 2017/0152374 A1    Jun. 1, 2017

(30) Foreign Application Priority Data
Jun. 17, 2014   (JP) ................................ 2014-124319

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/025* (2013.01); *C08L 2205/03* (2013.01)

(58) Field of Classification Search
CPC ...................................................... C08K 9/06
USPC ....................................................... 523/156
See application file for complete search history.

(56) References Cited

U.S. PATENT DOCUMENTS

| | | | |
|---|---|---|---|
| 6,410,624 B1 | 6/2002 | Maly et al. | |
| 2011/0086943 A1* | 4/2011 | Sato | B60C 1/0016 523/155 |
| 2012/0302664 A1* | 11/2012 | Kamada | B60C 1/0016 523/156 |
| 2013/0012651 A1* | 1/2013 | Sasajima | B60C 1/00 524/575 |
| 2013/0059965 A1* | 3/2013 | Hirose | B60C 1/0016 524/526 |

FOREIGN PATENT DOCUMENTS

| | | |
|---|---|---|
| JP | S61-162536 | 7/1986 |
| JP | 2001-114979 | 4/2001 |
| JP | 2007-161819 | 6/2007 |
| JP | 2009-091498 | 4/2009 |
| JP | 2012-241158 | 12/2012 |
| WO | WO 2011/105362 | 9/2011 |
| WO | WO 2011/148965 | 12/2011 |

OTHER PUBLICATIONS

International Search Report for International Application No. PCT/JP2015/067299 dated Sep. 1, 2015, 4 pages, Japan.

* cited by examiner

*Primary Examiner* — Doris L Lee
(74) *Attorney, Agent, or Firm* — Thorpe North & Western

(57) ABSTRACT

A rubber composition for tires according to the present technology comprises: a natural rubber, a diene-based blended rubber containing a solution-polymerized SBR and an emulsion-polymerized SBR, an aromatic modified terpene resin, a silica, and a carbon black. The solution-polymerized SBR contains a specific solution-polymerized SBR having a block containing an isoprene unit at one terminal thereof and a modified terminal for silica at the other terminal thereof. The styrene unit content in the emulsion-polymerized SBR is from 35 to 50 mass %. The content of the natural rubber and the total content of the solution-polymerized SBR and the emulsion-polymerized SBR in the diene-based blended rubber are specified, and the contents of aromatic modified terpene resin, the silica, and the carbon black relative to the content of the diene-based blended rubber are specified.

15 Claims, 1 Drawing Sheet

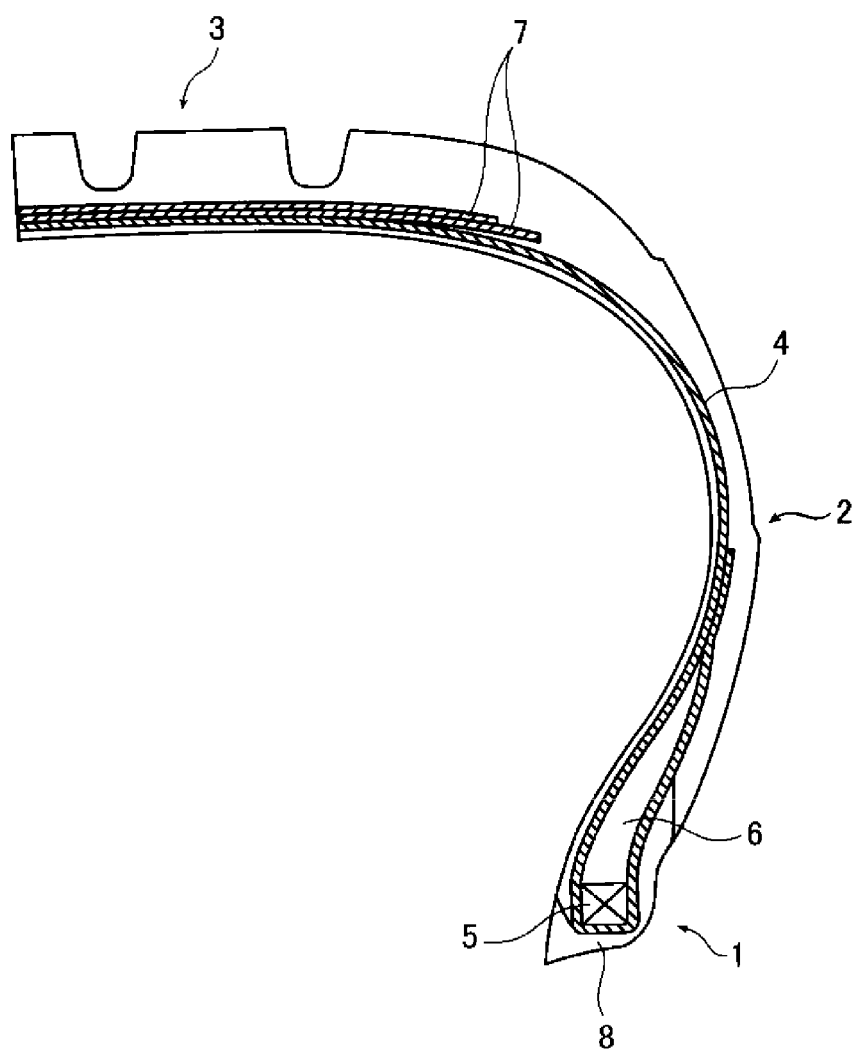

RUBBER COMPOSITION FOR TIRES AND PNEUMATIC TIRE

TECHNICAL FIELD

The present technology relates to a rubber composition for tires and a pneumatic tire.

BACKGROUND ART

In recent years, enhancement in wear resistance, wet performance, and dry performance have been demanded from the perspective of safety. The reduction in tire rolling resistance has also been demanded from the perspective of fuel efficiency when a vehicle is traveling. For these, methods of enhancing these functions by blending silica in a rubber component constituting a tread portion of a tire have been known.

However, silica has low affinity with rubber components, and the cohesiveness between silicas is high, so if silica is simply blended to the rubber component, the silica is not dispersed, which leads to the problem that the effect of enhancing these functions cannot be achieved sufficiently.

In this connection, International Patent Publication No. WO/2011/105362 discloses a rubber composition containing a conjugated diene rubber containing an isoprene block. International Patent Publication No. WO/2011/105362 describes that by using the above composition, the affinity between the silica and the rubber is good, and reduced heat build-up (low rolling resistance) and wet grip performance can be enhanced.

Meanwhile, as higher levels of safety are demanded, further enhancement in wear resistance, wet performance, and dry performance are demanded. Furthermore, environmental problems, resource problems, and the like have led to a demand for even better fuel efficiency in vehicles, which in turn has led to a demand for further enhancement in the low rolling resistance of tires.

In this connection, when the inventor of the present technology studied the rubber compositions described in International Patent Publication No. WO/2011/105362, it was found that the wear resistance, the wet performance, and the dry performance do not always satisfy the currently required levels.

SUMMARY

The present technology provides: a rubber composition for tires having excellent wear resistance, wet performance, dry performance, and low rolling resistance, when used in a tire; and a pneumatic tire using the rubber composition for ties in a tread portion thereof.

The inventor of the present technology has found that excellent wear resistance, wet performance, dry performance, and low rolling resistance are achieved when a tire is formed, by blending a natural rubber, a diene-based blended rubber containing a predetermined solution-polymerized SBR and a predetermined emulsion-polymerized SBR, an aromatic modified terpene resin, a silica, and a carbon black in predetermined proportions, and thus completed the present technology.

Specifically, the inventor discovered that the problem described above can be solved by the following features.

(1) A rubber composition for tires including: a natural rubber, a diene-based blended rubber containing a solution-polymerized styrene-butadiene rubber and an emulsion-polymerized styrene-butadiene rubber, an aromatic modified terpene resin, a silica, and a carbon black;

the solution-polymerized styrene-butadiene rubber containing a specific solution-polymerized styrene-butadiene rubber having a block containing an isoprene unit at one terminal thereof and a modified terminal for silica at the other terminal thereof;

a styrene unit content of the emulsion-polymerized styrene-butadiene rubber being from 35 to 50 mass %;

a content of the natural rubber in the diene-based blended rubber being from 10 to 30 mass %;

a total content of the solution-polymerized styrene-butadiene rubber and the emulsion-polymerized styrene-butadiene rubber in the diene-based blended rubber being from 70 to 90 mass %;

a content of the aromatic modified terpene resin being from 1 to 25 parts by mass per 100 parts by mass of the diene-based blended rubber;

a content of the silica being from 80 to 150 parts by mass per 100 parts by mass of the diene-based blended rubber; and a content of the carbon black being from 15 to 50 parts by mass per 100 parts by mass of the diene-based blended rubber.

(2) The rubber composition for tires according to (1) above, where the modified terminal for silica has at least one type of group selected from the group consisting of epoxy groups and hydrocarbyloxysilyl groups.

(3) The rubber composition for tires according to (1) or (2) above, where the silica has a nitrogen adsorption specific surface area ($N_2SA$) of 130 to 260 $m^2/g$.

(4) The rubber composition for tires according to any one of (1) to (3) above, where the silica has a nitrogen adsorption specific surface area ($N_2SA$) of 200 to 260 $m^2/g$.

(5) A pneumatic tire including a tread portion formed by using the rubber composition for tires described in any one of (1) to (4) above.

As described below, the present technology can provide: a rubber composition for tires having excellent wear resistance, wet performance, dry performance, and low rolling resistance, when used in a tire; and a pneumatic tire using the rubber composition for tires in a tread portion thereof.

BRIEF DESCRIPTION OF DRAWING

FIG. 1 is a partial cross-sectional schematic view of a tire that illustrates one embodiment of a pneumatic tire of the present technology.

DETAILED DESCRIPTION

The rubber composition for tires of the present technology (hereinafter, also simply referred to as "composition of the present technology") contains a natural rubber, a diene-based blended rubber containing a solution-polymerized styrene-butadiene rubber (SBR) and an emulsion-polymerized styrene-butadiene rubber (SBR), an aromatic modified terpene resin, a silica, and a carbon black.

Note that the solution-polymerized SBR contains a specific solution-polymerized SBR having a block containing an isoprene unit at one terminal thereof and a modified terminal for silica at the other terminal thereof.

Furthermore, the styrene unit content of the emulsion-polymerized SBR is from 35 to 50 mass % (hereinafter, the emulsion-polymerized SBR is also referred to as "specific emulsion-polymerized SBR").

The content of the natural rubber in the diene-based blended rubber is from 10 to 30 mass %.

Furthermore, the total content of the solution-polymerized SBR and the emulsion-polymerized SBR in the diene-based blended rubber is from 70 to 90 mass %.

Furthermore, the content of the aromatic modified terpene resin is from 1 to 25 parts by mass per 100 parts by mass of the diene-based blended rubber.

The content of the silica is from 80 to 150 parts by mass per 100 parts by mass of the diene-based blended rubber.

Furthermore, the content of the carbon black is from 15 to 50 parts by mass per 100 parts by mass of the diene-based blended rubber.

The composition of the present technology is thought to achieve desired effects as a result of having such a configuration. Although the reason for this is unknown, the reason is presumed to be as follows.

As described above, the specific solution-polymerized SBR contained in the composition of the present technology has a block containing an isoprene unit at one terminal thereof and a modified terminal for silica at the other terminal thereof. Therefore, it is conceived that these terminals interact with silica to form well-dispersed condition, thereby achieving excellent low rolling resistance. Furthermore, it is conceived that a flexible and firm three-dimensional network structure is formed by using the natural rubber, the emulsion-polymerized SBR having a particular microstructure (specifically, styrene unit content), the aromatic modified terpene resin, and the carbon black in predetermined proportions, thereby achieving excellent wear resistance, wet performance, and dry performance.

These are also assumed from the comparative examples described below, that is, when the specific solution-polymerized SBR is not contained, wear resistance, wet performance, and dry performance are insufficient (Comparative Example 1), when the specific solution-polymerized SBR is contained but the specific emulsion-polymerized SBR is not contained, wet performance and dry performance become insufficient (Comparative Example 2), when the components are contained but contained in proportions that are not the predetermined proportions, some of the performances are insufficient (Comparative Examples 3, 4, 7, and 8).

Each of the components contained in the rubber composition for tires of the present technology will be described in detail below.

Diene-Based Blended Rubber

The diene-based blended rubber contained in the composition of the present technology contains a natural rubber, a solution-polymerized SBR containing a specific solution-polymerized SBR, and a specific emulsion-polymerized SBR.

Natural Rubber

As described above, the diene-based blended rubber contains a natural rubber.

The content of the natural rubber in the diene-based blended rubber is from 10 to 30 mass %. In particular, the content is preferably from 15 to 25 mass %.

When the content of the natural rubber in the diene-based blended rubber is less than 10 mass %, wear resistance and dry performance of a tire become insufficient. Furthermore, when the content of the natural rubber in the diene-based blended rubber is greater than 30 mass %, wear resistance, wet performance, and dry performance become insufficient.

Solution-Polymerized SBR

The solution-polymerized SBR contained in the diene-based blended rubber contains a specific solution-polymerized SBR described below. The content of the specific solution-polymerized SBR in the solution-polymerized SBR is not particularly limited; however, the content is preferably 10 mass % or greater, more preferably 20 mass % or greater, and particularly preferably 50 mass % or greater.

The specific solution-polymerized SBR is not particularly limited as long as the specific solution-polymerized SBR is a solution-polymerized SBR having a block containing an isoprene unit at one terminal thereof and a modified terminal for silica at the other terminal thereof.

The block containing an isoprene unit is not particularly limited as long as the block is a homopolymer of isoprene or a copolymer of isoprene and another monomer. The content of the isoprene unit is not particularly limited; however, the content is preferably 70 mass % or greater, more preferably 80 mass % or greater, even more preferably 90 mass % or greater, and particularly preferably 100 mass %.

As described above, the specific solution-polymerized SBR has a modified terminal for silica on the other terminal. That is, in the specific solution-polymerized SBR, the other terminal is modified to be a terminal that can interact with silica (preferably a terminal that can be reacted with a silanol group on the silica surface).

The modified terminal for silica is not particularly limited as long as the modified terminal for silica is a terminal that can interact with silica; however, examples thereof include a terminal having a polyorganosiloxane structure, and the like.

The modified terminal for silica preferably has at least one type of group selected from the group consisting of epoxy groups and hydrocarbyloxysilyl groups.

Examples of the preferred embodiment of the solution-polymerized SBR include a solution-polymerized SBR (P) containing 5 mass % or greater of a structural unit (p) described below, in which three or more SBR-based polymer chains (p1) described later are bonded via a modifying agent (p2) described later, obtained by a reaction of the SBR-based polymer chains (p1) and the modifying agent (p2).

SBR-Based Polymer Chain (P1)

The SBR-based polymer chain (p1) used to form the structural unit (p) contained in the solution-polymerized SBR (P) is not particularly limited as long as the SBR-based polymer chain (p1) is a polymer chain including a butadiene-based monomer unit and a styrene-based monomer unit, and has an isoprene block on one terminal and an active terminal (polymerization active terminal or living growth terminal) on the other terminal.

The SBR-based polymer chain (p1) can be obtained by, for example, forming an isoprene block having an active terminal (polymerization active terminal or living growth terminal) by living polymerization of isoprene or an isoprene mixture containing a predetermined content of isoprene, in an inert solvent by using a polymerization initiator, and then bonding a monomer mixture containing a butadiene-based monomer and a styrene-based monomer to the isoprene block having an active terminal, and continuously performing living polymerization.

Isoprene Block

The isoprene block is an isoprene homopolymer or a copolymer of isoprene and another monomer, and is a polyisoprene having an isoprene unit content of 70 mass % or greater. The content of isoprene units in the isoprene block is preferably 80 mass % or greater, more preferably 90 mass % or greater, and particularly preferably 100 mass %.

As described above, the SBR-based polymer chain (p1) described above has the isoprene block described above on one terminal. The SBR-based polymer chain (p1) may further has an isoprene block in its chain. The SBR-based polymer chain (p1) may have isoprene blocks on both terminals, of which the isoprene block on one terminal has an active terminal, but from the perspective of productivity, it is preferred that only the terminal that is not an active terminal has an isoprene block.

The weight average molecular weight of the isoprene block is not particularly limited, but from the perspective of strength, it is preferably from 500 to 25,000, more preferably from 1,000 to 15,000, and particularly preferably from 1,500 to 10,000.

The molecular weight distribution of the isoprene block which is represented by the ratio (Mw/Mn) of the weight average molecular weight (Mw) to the number average molecular weight (Mn) is not particularly limited, but from the perspective of productivity, it is preferably from 1.0 to 1.5, more preferably from 1.0 to 1.4, and particularly preferably from 1.0 to 1.3.

The other monomer that can copolymerize with isoprene that may be used to obtain an isoprene block is not particularly limited as long as the other monomer can copolymerize with isoprene, but examples include 1,3-butadiene, styrene, α-methylstyrene, and the like. Among these, styrene is preferred. The content of the other monomer units in the isoprene block is less than 30 mass %, preferably less than 20 mass %, and more preferably less than 10 mass %, and it is particularly preferred that no monomers other than isoprene units are contained.

The inert solvent used in polymerization of isoprene (or isoprene mixture) is not particularly limited as long as the inert solvent is one normally used in solution polymerization and does not hinder the polymerization reaction. Specific examples include chain aliphatic hydrocarbons such as butane, pentane, hexane, heptane, and 2-butene; alicyclic hydrocarbons such as cyclopentane, cyclohexane, and cyclohexene; and aromatic hydrocarbons such as benzene, toluene, and xylene, and the like. The used amount of inert solvent is not particularly limited, but normally, it is preferably an amount that results in the concentration of all monomers (isoprene and other monomers) being from 1 to 50 mass %, and preferably from 10 to 40 mass %.

The polymerization initiator used when synthesizing the isoprene block is not particularly limited as long as the polymerization initiator can living-polymerize the isoprene (or isoprene mixture) and provide a polymer chain having an active terminal, but examples include polymerization initiators having a primary catalyst of an organic alkali metal compound, organic alkali earth metal compound, or lanthanide series metal compound. Specific examples of the organic alkali metal compound include organic monolithium compounds such as n-butyllithium, sec-butyllithium, t-butyllithium, hexyl lithium, phenyl lithium, stilbene lithium, and the like; organic poly-lithium compounds such as dilithiomethane, 1,4-dilithiobutane, 1,4-dilithio-2-ethylcyclohexane, 1,3,5-trilithiobenzene, 1,3,5-tris(lithiomethyl)benzene, and the like; organic sodium compounds such as sodium naphthalene and the like; and organic potassium compounds such as potassium naphthalene and the like; and the like. Examples of the organic alkali earth metal compound include di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diketylbarium, and the like. Examples of the polymerization initiators having a lanthanide series metal compound as a primary catalyst include polymerization initiators containing a primary catalyst of a lanthanide series metal salt containing a lanthanide series metal such as lanthanum, cerium, praseodymium, neodymium, samarium, and gadolinium, and a carboxylic acid or phosphorus-containing organic acid, together with a promoter such as an alkylaluminum compound, organoaluminum hydride compound, or organoaluminum halide compound. Among these polymerization initiators, organic monolithium compounds and organic poly-lithium compounds are preferred, organic monolithium compounds are more preferred, and n-butyllithium is particularly preferred. Furthermore, the organic alkali metal compound may be used as an organic alkali metal amide compound after first reacting it with a secondary amine such as dibutylamine, dihexylamine, dibenzylamine, pyrrolidine, hexamethyleneimine, and heptamethyleneimine (preferably pyrrolidine, hexamethyleneimine or heptamethyleneimine). A single polymerization initiator may be used alone or a combination of two or more polymerization initiators may be used.

The used amount of polymerization initiator should be determined according to the targeted molecular weight, but it is preferably from 4 to 250 mmol, more preferably from 30 to 200 mmol, and particularly preferably from 40 to 100 mmol, per 100 g of the isoprene (or isoprene mixture).

The polymerization temperature when polymerizing the isoprene (or isoprene mixture) is normally from −80 to 150° C., preferably from 0 to 100° C., and more preferably from 20 to 90° C.

To adjust the vinyl bond content derived from isoprene units in the isoprene block, a polar compound is preferably added to the inert organic solvent at the time of polymerization. Examples of the polar compound include ether compounds such as dibutylether, tetrahydrofuran, and 2,2-di(tetrahydrofuryl)propane; tertiary amines such as tetramethylethylenediamine; alkali metal alkoxides; phosphine compounds; and the like. Among these, ether compounds and tertiary amines are preferred, among which those capable of forming a chelate structure with the metal of the polymerization initiator are more preferred, and 2,2-di(tetrahydrofuryl)propane and tetramethylethylenediamine are particularly preferred. The used amount of polar compound should be determined according to the targeted vinyl bond content, but it is preferably from 0.1 to 30 mol, and more preferably from 0.5 to 10 mol, relative to 1 mol of the polymerization initiator. When the used amount of polar compound is within this range, it is easy to adjust the vinyl bond content, and problems due to deactivation of the polymerization initiator tend not to occur.

The vinyl bond content derived from isoprene units in the isoprene block is preferably from 5 to 85 mass %, more preferably from 21 to 85 mass %, even more preferably from 50 to 80 mass %, and particularly preferably 70 to 80 mass %. Furthermore, the vinyl bond content derived from isoprene units is the proportion (mass %) of the total of 1,2-vinyl bonds derived from isoprene units and 3,4-vinyl bonds derived from isoprene units in the isoprene block.

Portion Other than Isoprene Block

The portion other than isoprene block in the SBR-based polymer chain (p1) is a copolymer chain of a butadiene-based monomer and a styrene-based monomer. The mass ratio of butadiene-based monomer units to styrene-based monomer units (butadiene-based monomer units:styrene-based monomer units) in a portion other than the isoprene block is preferably from 100:0 to 50:50, and more preferably from 90:10 to 70:30.

Examples of the butadiene-based monomer used to obtain a portion other than the isoprene block in the SBR-based polymer chain (p1) include 1,3-butadiene, isoprene (2-methyl-1,3-butadiene), 2,3-dimethyl-1,3-butadiene, 2-chloro-1,3-butadiene, and the like. Among these, 1,3-butadiene or isoprene is preferred, and 1,3-butadiene is more preferred. Such a butadiene-based monomer may be used alone, or a combination of two or more types may be used.

The styrene-based monomer used to obtain a portion other than the isoprene block in the SBR-based polymer chain (p1) is not particularly limited; however, examples thereof include styrene, α-methylstyrene, 2-methylstyrene, 3-methylstyrene, 4-methylstyrene, 2-ethyl styrene, 3-ethyl styrene, 4-ethyl styrene, 2,4-diisopropylstyrene, 2,4-dimethylstyrene, 4-t-butyl styrene, 5-t-butyl-2-methylstyrene, dimethylaminomethylstyrene, dimethylaminoethylstyrene, and the like. Among these, styrene, α-methylstyrene, and 4-methylstyrene are preferred, and styrene is more preferred. Such a styrene-based monomer may be used alone, or a combination of two or more types may be used.

The monomer used to obtain a portion other than the isoprene block in the SBR-based polymer chain (p1) may be a monomer other than a butadiene-based monomer or styrene-based monomer as desired, provided that the essential characteristics of the present technology are maintained. Examples of other monomers include α- and β-unsaturated nitriles such as acrylonitrile and methacrylonitrile; unsaturated carboxylic acids or acid anhydrides such as acrylic acid, methacrylic acid, and maleic anhydride; unsaturated carboxylic acid esters such as methylmethacrylate, ethylacrylate, and butylacrylate; and non-conjugated dienes such as 1,5-hexadiene, 1,6-heptadiene, 1,7-octadiene, dicyclopentadiene, and 5-ethylidene-2-norbornene; and the like. The used amount of these monomers is preferably 10 mass % or less, and more preferably 5 mass % or less, of the total of all monomers used to obtain the portion other than the isoprene block in the SBR-based polymer chain (p1).

The inert solvents used in polymerization of the portion other than the isoprene block in the SBR-based polymer chain (p1) are the same as the inert solvents used in synthesis of the isoprene block described above.

The isoprene block containing an active terminal described above may be used as is as the polymerization initiator used in synthesis of the portion other than the isoprene block in the SBR-based polymer chain (p1). The used amount of polymerization initiator should be determined according to the targeted molecular weight, but is preferably from 0.1 to 5 mmol, more preferably from 0.2 to 2 mmol, and particularly preferably from 0.3 to 1.5 mmol, per 100 g of the monomer (mixture).

The polymerization temperature at the time when the portion other than the isoprene block in the SBR-based polymer chain (p1) is polymerized is typically from –80 to 150° C., preferably from 0 to 100° C., and more preferably from 20 to 90° C. The polymerization mode may be in any mode such as batch mode or continuous mode. However, batch mode is preferable.

The bonding type of the portion other than the isoprene block in the SBR-based polymer chain (p1) may be a variety of bonding types such as block, tapered, random, or the like. Among these, random bonding is preferred. When the bonding type between the butadiene-based monomer and the styrene-based monomer is random, it is preferred that the butadiene-based monomer or the butadiene-based monomer and styrene-based monomer are supplied and polymerized continuously or intermittently to the polymerization system so that the ratio of the styrene-based monomer relative to the total amount of the butadiene-based monomer and the styrene-based monomer is not too high in the polymerization system.

To adjust the vinyl bond content in the portion other than the isoprene block of the SBR-based polymer chain (p1), a polar compound is preferably added to the inert organic solvent at the time of polymerization, similar to the time of adjusting the vinyl bond content derived from isoprene units in the isoprene block. However, a polar compound does not have to be added again if a polar compound has already been added to the inert organic solvent in an amount sufficient to adjust the vinyl bond content in the portion other than the isoprene block of the SBR-based polymer chain when the isoprene block is synthesized. Specific examples of the polar compound used to adjust the vinyl bond content in the portion other than the isoprene block are the same as the polar compounds used in synthesis of the isoprene block described above. The used amount of polar compound should be determined according to the targeted vinyl bond content, but is preferably from 0.01 to 100 mol, and more preferably from 0.1 to 30 mol, relative to 1 mol of the polymerization initiator. When the used amount of polar compound is within this range, it is easy to adjust the vinyl bond content in the portion other than the isoprene block, and problems due to deactivation of the polymerization initiator tend not to occur.

From the perspective of obtaining a balance of viscoelastic characteristics and strength, the vinyl bond content in the portion other than the isoprene block of the SBR-based polymer chain (p1) is preferably from 10 to 90 mass %, and more preferably from 20 to 80 mass %.

Note that the vinyl bond content in the portion other than the isoprene block is the proportion (mass %) of vinyl bond units in the portion other than the isoprene block of the SBR-based polymer chain (p1).

Molecular Weight of SBR-Based Polymer Chain (p1)

The weight average molecular weight of the SBR-based polymer chain (p1) is not particularly limited, but is preferably from 1,000 to 2,000,000, more preferably from 10,000 to 1,500,000, and particularly preferably from 100,000 to 1,000,000.

The molecular weight distribution of the SBR-based polymer chain (p1) which is expressed as the ratio (Mw/Mn) of the weight average molecular weight (Mw) to the number average molecular weight (Mn) is preferably from 1.0 to 3.0, more preferably from 1.0 to 2.5, and particularly preferably from 1.0 to 2.2. When the value of molecular weight distribution (Mw/Mn) is within the range described above, production of the solution-polymerized SBR (P) is facilitated.

Production Method of SBR-Based Polymer Chain (p1)

As described above, the SBR-based polymer chain (p1) may be obtained by, for example, first forming an isoprene block containing an active terminal by living polymerization of isoprene (or an isoprene mixture) using a polymerization initiator in an inert solvent, followed by living polymerization of a butadiene-based monomer and a styrene-based monomer using this isoprene block as a new polymerization initiator. In this case, the isoprene block may be added to a solution of the monomer, or the monomer may be added to a solution of the isoprene block, but it is preferred that the isoprene block is added to a solution of the monomer. Furthermore, an isoprene block may be formed on the active terminal side of the SBR-based polymer chain (p1) by adding isoprene (or an isoprene mixture) anew at the point when the polymer conversion rate of the monomer reaches, typically, 95% or greater. The used amount of this isoprene (or isoprene mixture) is preferably from 10 to 100 mol, more preferably from 15 to 70 mol, and particularly preferably from 20 to 35 mol, relative to 1 mol of the polymerization initiator used in the first polymerization reaction.

Preferred Embodiment of SBR-Based Polymer Chain (p1)

The preferred range of the mass ratio of butadiene-based monomer units to styrene-based monomer units (butadiene-based monomer units:styrene-based monomer units) in the SBR-based polymer chain (p1) is the same as that of the portion other than the isoprene block described above. The preferred range of the vinyl bond content in the SBR-based polymer chain (p1) is also the same as that of the portion other than the isoprene block described above. Note that the vinyl bond content in the SBR-based polymer chain (p1) is the proportion (mass %) of vinyl bond units in the SBR-based polymer chain (p1).

Modifying Agent (p2)

The solution-polymerized SBR (P) is formed by a reaction between the active terminal of the SBR-based polymer chain (p1) obtained as described above and a modifying agent (p2) containing at least one selected from the group consisting of epoxy groups and hydrocarbyloxysilyl groups, wherein the total number of the epoxy groups and the hydrocarbyloxy groups (—OR: where R is a hydrocarbon group or an aryl group) contained in the hydrocarbyloxysilyl group is three or greater.

In the present specification, a "modifying agent" is a compound that contains, in each molecule, a functional group that reacts with the active terminal of the SBR-based polymer chain (p1). However, the above-mentioned functional groups contained are limited to those having affinity with silica. In the present technology, the functional group described above is an epoxy group or a hydrocarbyloxy group contained in a hydrocarbyloxysilyl group.

The modifying agent (p2) used to form the structural unit (p) contained in the solution-polymerized SBR (P) is not particularly limited as long as the modifying agent contains at least one selected from the group consisting of epoxy groups and hydrocarbyloxysilyl groups, and the total number of the epoxy groups and the hydrocarbyloxy groups contained in the hydrocarbyloxysilyl group is three or greater. Specifically, the modifying agent (p2) may be a modifying agent having three or more epoxy groups in each molecule or a modifying agent having, in each molecule, a hydrocarbyloxysilyl group, in which three or more hydrocarbyloxy groups bonded to silicon atoms of the hydrocarbyloxysilyl group are contained in each molecule. Additionally, it may be a modifying agent containing both epoxy groups and hydrocarbyloxysilyl groups in the molecule, wherein the total number of the epoxy groups and the hydrocarbyloxy groups bonded to silicon atoms in the hydrocarbyloxysilyl group is three or greater in each molecule. Furthermore, when the modifying agent (p2) contains a hydrocarbyloxysilyl group, in which two or more hydrocarbyloxy groups bonded to silicon atoms are contained in the hydrocarbyloxysilyl group in each molecule, it indicates a molecule containing two or more silicon atoms having one hydrocarbyloxy group, a molecule having two or more hydrocarbyloxy groups on the same silicon atom, or a combination thereof. Note that when an organic group other than a hydrocarbyloxy group is bonded to a silicon atom of the hydrocarbyloxysilyl group, this organic group is not particularly limited.

It is considered that when the SBR-based polymer chain (p1) reacts with a modifying agent (p2) containing an epoxy group, through ring-opening of at least some of the epoxy groups in the modifying agent (p2), a bond is formed between a carbon atom of the portion where the epoxy group ring has been opened and the active terminal of the SBR-based polymer chain (p1). Furthermore, it is considered that when the SBR-based polymer chain (p1) reacts with a modifying agent (p2) containing a hydrocarbyloxysilyl group, through detachment of at least some of the hydrocarbyloxy groups in the hydrocarbyloxysilyl groups in the modifying agent (p2), a bond is formed between a silicon atom contained in the modifying agent (p2) and the active terminal of the SBR-based polymer chain (p1).

By using a modifying agent (p2) in which the total number of epoxy groups and hydrocarbyloxy groups contained in hydrocarbyloxysilyl groups is three or greater, a solution-polymerized SBR (P) containing a structural unit (p) in which three or more SBR-based polymer chains (p1) described above are bonded via the modifying agent (p2) described above is obtained.

Examples of the hydrocarbyloxysilyl group contained in the modifying agent (p2) include alkoxysilyl groups such as a methoxysilyl group, an ethoxysilyl group, a propoxysilyl group, and a butoxysilyl group; and aryloxysilyl groups such as a phenoxysilyl group. Among these, an alkoxysilyl group is preferred, and an ethoxysilyl group is more preferred.

Examples of the hydrocarbyloxy group contained in the hydrocarbyloxysilyl group contained in the modifying agent (p2) include alkoxy groups such as a methoxy group, an ethoxy group, a propoxy group, and a butoxy group; and aryloxy groups such as a phenoxy group. Among these, an alkoxy group is preferred, and an ethoxy group is more preferred.

The modifying agent (p2) is preferably a polyorganosiloxane.

Examples of preferred embodiments of the modifying agent (p2) include polyorganosiloxanes represented by Formula (A1) below, polyorganosiloxanes represented by Formula (A2) below, polyorganosiloxanes represented by Formula (A3) below, hydrocarbyloxysilanes represented by Formula (A4) below, and the like. Among these, polyorganosiloxanes represented by Formula (A1) below, polyorganosiloxanes represented by Formula (A2) below, and polyorganosiloxanes represented by Formula (A3) below are preferred, and polyorganosiloxanes represented by Formula (A1) below are more preferred.

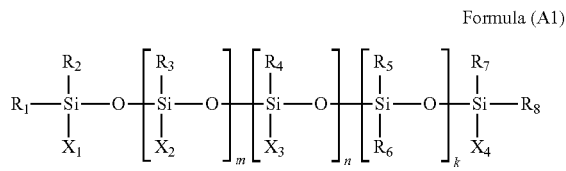

Formula (A1)

In Formula (A1) above, $R_1$ to $R_8$ are the same or different and are alkyl groups having from 1 to 6 carbons or aryl groups having from 6 to 12 carbons. In Formula (A1) above, $X_1$ and $X_4$ are the same or different and are alkoxy groups having from 1 to 5 carbons, aryloxy groups having from 6 to 14 carbons, epoxy group-containing groups having from 4 to 12 carbons, alkyl groups having from 1 to 6 carbons, or aryl groups having from 6 to 12 carbons. In Formula (A1) above, $X_2$ is an alkoxy group having from 1 to 5 carbons, an aryloxy group having from 6 to 14 carbons, or an epoxy group-containing group having from 4 to 12 carbons. In Formula (A1) above, $X_3$ is a group containing from 2 to 20 repeating alkylene glycol units. In Formula (A1) above, m is an integer from 3 to 200, n is an integer from 0 to 200, and k is an integer from 0 to 200.

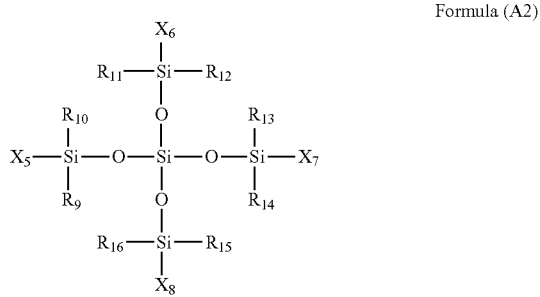

Formula (A2)

In Formula (A2) above, $R_9$ to $R_{16}$ are the same or different and are alkyl groups having from 1 to 6 carbons or aryl groups having from 6 to 12 carbons. In Formula (A2) above, $X_5$ to $X_8$ are the same or different and are alkoxy groups having from 1 to 5 carbons, aryloxy groups having from 6 to 14 carbons, or epoxy group-containing groups having from 4 to 12 carbons.

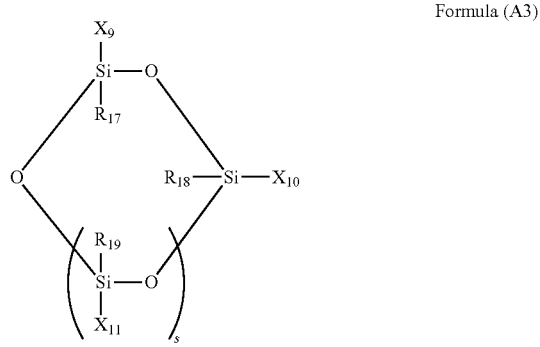

Formula (A3)

In Formula (A3) above, $R_{17}$ to $R_{19}$ are the same or different and are alkyl groups having from 1 to 6 carbons or aryl groups having from 6 to 12 carbons. In Formula (A3) above, $X_9$ to $X_{11}$ are the same or different and are alkoxy groups having from 1 to 5 carbons, aryloxy groups having from 6 to 14 carbons, or epoxy group-containing groups having from 4 to 12 carbons. In Formula (A3) above, s is an integer from 1 to 18.

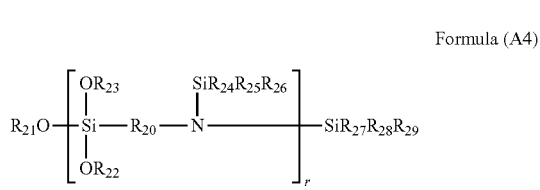

Formula (A4)

In Formula (A4) above, $R_{20}$ is an alkylene group having from 1 to 12 carbons. In Formula (A4) above, $R_{21}$ to $R_{29}$ are the same or different and are alkyl groups having from 1 to 6 carbons or aryl groups having from 6 to 12 carbons. In Formula (A4) above, r is an integer from 1 to 10.

Examples of the alkyl groups having from 1 to 6 carbons represented by $R_1$ to $R_8$, $X_1$, and $X_4$ in the polyorganosiloxanes represented by Formula (A1) above include a methyl group, an ethyl group, an n-propyl group, an isopropyl group, a butyl group, a pentyl group, a hexyl group, a cyclohexyl group, and the like. Examples of the aryl groups having from 6 to 12 carbons include a phenyl group, a methylphenyl group, and the like. Among these, a methyl group and an ethyl group are preferred from the perspective of production of the polyorganosiloxane itself.

Examples of the alkoxyl groups having from 1 to 5 carbons represented by $X_1$, $X_2$, and $X_4$ in the polyorganosiloxanes represented by Formula (A1) above include a methoxy group, an ethoxy group, a propoxy group, an isopropoxy group, a butoxy group, and the like. Among these, a methoxy group and an ethoxy group are preferred from the perspective of reactivity with the active terminal of the SBR-based polymer chain (p1).

Examples of the aryloxy groups having from 6 to 14 carbons represented by $X_1$, $X_2$, and $X_4$ in the polyorganosiloxanes represented by Formula (A1) above include a phenoxy group, a tolyloxy group, and the like.

Examples of the epoxy group-containing groups having from 4 to 12 carbons represented by $X_1$, $X_2$, and $X_4$ in the polyorganosiloxanes represented by Formula (A1) above include groups represented by Formula (A5) below.

Formula (A5)

In Formula (A5) above, $Z_1$ is an alkyl arylene group or alkylene group having from 1 to 10 carbons; $Z_2$ is a methylene group, a sulfur atom, or an oxygen atom; and E is an epoxy group-containing hydrocarbyl group (hydrocarbon group) having from 2 to 10 carbons. In Formula (A5) above, * indicates a bond position.

In the groups represented by Formula (A5) above, preferably, $Z_2$ is an oxygen atom; more preferably, $Z_2$ is an oxygen atom and E is a glycidyl group; and particularly preferably, $Z_1$ is an alkylene group having three carbons, $Z_2$ is an oxygen atom, and E is a glycidyl group.

In the polyorganosiloxane represented by Formula (A1) above, $X_1$ and $X_4$ are preferably epoxy group-containing groups having from 4 to 12 carbons or alkyl groups having from 1 to 6 carbons among the above, and $X_2$ is preferably an epoxy group-containing group having from 4 to 12 carbons among the above. More preferably, $X_1$ and $X_4$ are alkyl groups having from 1 to 6 carbons and $X_2$ is an epoxy group-containing group having from 4 to 12 carbons.

In the polyorganosiloxane represented by Formula (A1) above, a group represented by Formula (A6) below is preferred as $X_3$, that is, a group containing from 2 to 20 repeating alkylene glycol units.

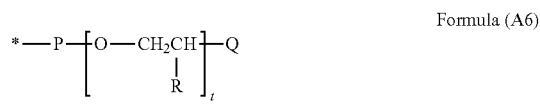

Formula (A6)

In Formula (A6) above, t is an integer from 2 to 20, P is an alkyl arylene group or an alkylene group having from 2 to 10 carbons, R is a hydrogen atom or a methyl group, and Q is an aryloxy group or an alkoxy group having from 1 to 10 carbons. In Formula (A6), * indicates a bond position. Among these, preferably, t is an integer from 2 to 8, P is an alkylene group having 3 carbons, R is a hydrogen atom, and Q is a methoxy group.

In the polyorganosiloxanes represented by Formula (A1) above, m is an integer of preferably 20 to 150, and more preferably 30 to 120, because low rolling resistance and mechanical strength are superior.

In the polyorganosiloxanes represented by Formula (A1) above, n is an integer of preferably 0 to 150, and more preferably 0 to 120. In the polyorganosiloxanes represented by Formula (A1) above, k is an integer of preferably 0 to 150, and more preferably 0 to 120.

In the polyorganosiloxanes represented by Formula (A1) above, the total number of m, n, and k is preferably 400 or less, more preferably 300 or less, and particularly preferably 250 or less. When the total number of m, n, and k is 400 or less, production of the polyorganosiloxane itself is easy and it is easy to handle without viscosity being too high.

In the polyorganosiloxane represented by Formula (A2) above, the specific examples and preferred embodiments of $R_9$ to $R_{16}$ are the same as those of $R_1$ to $R_8$ in Formula (A1) above. Furthermore, in the polyorganosiloxane represented by Formula (A2) above, the specific examples and preferred embodiments of $X_5$ to $X_8$ are the same as those of $X_2$ in Formula (A1) above.

In the polyorganosiloxanes represented by Formula (A3) above, the specific examples and preferred embodiments of $R_{17}$ to $R_{19}$ are the same as those of $R_1$ to $R_8$ in Formula (A1) above. Furthermore, in the polyorganosiloxane represented by Formula (A3) above, the specific examples and preferred embodiments of $X_9$ to $X_{11}$ are the same as those of $X_2$ in Formula (A1) above.

In the hydrocarbyloxysilanes represented by Formula (A4) above, examples of the alkylene group having from 1 to 12 carbons represented by $R_{20}$ include a methylene group, an ethylene group, a propylene group, and the like. Among these, a propylene group is preferred.

In the hydrocarbyloxysilanes represented by Formula (A4) above, the specific examples and preferred embodiments of $R_{21}$ to $R_{29}$ are the same as those of $R_1$ to $R_8$ in Formula (A1) above.

Specific examples of the hydrocarbyloxysilanes represented by Formula (A4) above are N,N-bis(trimethylsilyl)-3-aminopropyltrimethoxysilane, N,N-bis(trimethylsilyl)-3-aminopropyltriethoxysilane, N,N-bis(trimethylsilyl) aminoethyltrimethoxysilane, N,N-bis(trimethylsilyl) aminoethyltriethoxysilane, and the like. Among these, N,N-bis(trimethylsilyl)-3-aminopropyltrimethoxysilane and N,N-bis(trimethylsilyl)-3-aminopropyltriethoxysilane are preferred.

Other examples of the modifying agent (p2) include tetraalkoxysilane compounds such as tetramethoxysilane; hexaalkoxysilane compounds such as bis(trimethoxysilyl)methane; alkylalkoxysilane compounds such as methyltriethoxysilane; alkenyl alkoxysilane compounds such as vinyltrimethoxysilane; arylalkoxysilane compounds such as phenyltrimethoxysilane; halogenoalkoxysilane compounds such as triethoxychlorosilane; epoxy group-containing alkoxysilane compounds such as 3-glycidoxyethyltrimethoxysilane, 3-glycidoxybutylpropyltrimethoxysilane, and bis(3-glycidoxypropyl)dimethoxysilane; sulfur-containing alkoxysilane compounds such as bis(3-(triethoxysilyl)propyl)di sulfide; amino group-containing alkoxysilane compounds such as bis(3-trimethoxysilylpropyl)methylamine; isocyanate group-containing alkoxysilane compounds such as tris(3-trimethoxysilylpropyl)isocyanurate; epoxy group-containing compounds such as tetraglycidyl-1,3-bisaminomethylcyclohexane; and the like.

A single modifying agent (p2) may be used alone or a combination of two or more may be used.

The used amount of modifying agent (p2) is not particularly limited, but the proportion of the total number of moles of epoxy groups and the hydrocarbyloxy groups contained in hydrocarbyloxysilyl groups in the modifying agent (p2) that reacts with the active terminal of the SBR-based polymer chain (p1), relative to the number of moles of polymerization initiator used in the polymerization reaction, is typically from 0.1 to 5, and, from the perspective of superior low rolling resistance and mechanical strength, preferably from 0.5 to 3.

Before reacting the SBR-based polymer chain (p1) with the modifying agent (p2) above, a polymerization inhibitor, a polymerization terminal modifying agent other than the modifying agent (p2), and a coupling agent may be added to the polymerization system in a range that does not hinder the effect of the present technology, to deactivate some of the active terminals of the SBR-based polymer chain (p1).

Examples of the polymerization terminal modifying agent and coupling agent used in this case include N-substituted cyclic amines such as N-methyl-2-pyrrolidone, N-vinyl-2-pyrrolidone, N-phenyl-2-pyrrolidone, and N-methyl-ε-caprolactam; N-substituted cyclic ureas such as 1,3-dimethylethylene urea and 1,3-diethyl-2-imidazolidinone; N-substituted aminoketones such as 4,4'-bis(dimethylamino)benzophenone and 4,4'-bis(diethylamino)benzophenone; aromatic isocyanates such as diphenylmethane diisocyanate and 2,4-tolylene diisocyanate; N,N-di-substituted aminoalkylmethacrylamides such as N,N-dimethylaminopropylmethacrylamide; N-substituted aminoaldehydes such as 4-N,N-dimethylaminobenzaldehyde; N-substituted carbodiimides such as dicyclohexylcarbodiimide; Schiff bases such as N-ethylethylidene imine and N-methylbenzylidene imine; pyridyl group-containing vinyl compounds such as 4-vinylpyridine; halogenated metal compounds such as tin tetrachloride, silicon tetrachloride, hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, and 1,6-bis(trichlorosilyl)hexane; and the like. Among these, from the perspective of superior coupling efficiency, use of a halogenated metal compound as a coupling agent is preferred, use of a halogenated silicon compound having five or more silicon-halogen atom bonds in each molecule is more preferred, and 1,6-bis(trichlorosilyl)hexane is particularly preferred.

The used amount of coupling agent is not particularly limited as long as the amount is in a range that does not hinder the effect of the present technology. For example, for a halogenated silicon compound containing five or more silicon-halogen atom bonds in each molecule, the proportion of the number of moles of silicon-halogen atom bonds of the halogenated silicon compound relative to the number of moles of the polymerization initiator used in the polymerization reaction is preferably from 0.001 to 0.25, and more preferably from 0.01 to 0.2, because low rolling resistance and mechanical strength are superior.

A single coupling agent may be used alone or a combination of two or more may be used.

When adding the modifying agent (p2), the coupling agent, and the like to the solution containing the SBR-based polymer chain (p1), it is preferable to add them to the polymerization system after dissolving them in an inert solvent from the perspective of controlling the reaction well. The solution concentration is preferably from 1 to 50 mass %.

Solution-Polymerized SBR (P)

The solution-polymerized SBR (P) is a solution-polymerized SBR obtained by a reaction of the SBR-based polymer chain (p1) and the modifying agent (p2), and specifically is solution-polymerized SBR containing 5 mass % or greater of a structural unit (p), in which three or more SBR-based polymer chains (p1) are bonded via a modifying agent (p2).

The reaction between the SBR-based polymer chain (p1) and the modifying agent (p2) may be performed by, for example, adding the modifying agent (p2) to a solution containing the SBR-based polymer chain (p1). The timing of adding the modifying agent (p2), coupling agent, and the like is not particularly limited, but it is desirable to add them in a state where the polymerization reaction in the SBR-based polymer chain (p1) has not been completed and the solution containing the SBR-based polymer chain (p1) contains a monomer such as isoprene. More specifically, the modifying agent (p2), coupling agent, and the like are preferably added to the solution containing the SBR-based polymer chain (p1) while the solution is in a state where it contains preferably 100 ppm or greater, and more preferably from 300 to 50,000 ppm, of monomer. By adding the modifying agent (p2), the coupling agent, and the like, it is possible to control the reaction well by suppressing side reactions between the SBR-based polymer chain (p1) and impurities contained in the polymerization system.

When two or more types among the modifying agent (p2), coupling agent, and the like are used in combination to obtain the solution-polymerized SBR (P), the order in which they are added to the polymerization system is not particularly limited. Even when the modifying agent (p2) is used in combination with a halogenated silicon compound as a coupling agent containing five or more silicon-halogen atom bonds in each molecule, the order of addition thereof is not particularly limited, but the coupling agent is preferably added before the modifying agent (p2) is added. By adding them in this order, a highly branched solution-polymerized SBR obtained via the coupling agent is readily obtained, and a tire obtained using this highly branched solution-polymerized SBR has superior steering stability.

As the conditions for reacting the modifying agent (p2), the coupling agent, and the like, the temperature is typically from 0 to 100° C. and preferably from 30 to 90° C., and the reaction time of each is typically from 1 to 120 minutes and preferably from 2 to 60 minutes.

After the modifying agent (p2) is reacted with the SBR-based polymer chain (p1), it is preferred that an alcohol such as methanol or water is added to deactivate the active terminal.

After the active terminal of the SBR-based polymer chain (p1) is deactivated, anti-aging agents such as phenol-based stabilizers, phosphorus-based stabilizers, or sulfur-based stabilizers, crumbling agents, antiscale agents, and the like are added to the polymerization solution as desired, and then the polymerization solvent is separated from the polymerization solution by direct drying or steam stripping, to recover the solution-polymerized SBR (P). Furthermore, before separating the polymerization solvent from the polymerization solution, extender oil may be mixed to the polymerization solution to recover the solution-polymerized SBR (P) as an oil-extended rubber.

Examples of the extender oil used during the recovery of the solution-polymerized SBR (P) as an oil-extended rubber include paraffin-based, aromatic, and naphthene-based petroleum-based softeners, vegetable-based softeners, fatty acids, and the like. When a petroleum-based softener is used, the polycyclic aromatic content is preferably less than 3%. This content is measured by the method of IP346 (test method of the Institute of Petroleum in the UK). When an extender oil is used, the used amount is typically from 5 to 100 parts by mass, preferably from 10 to 60 parts by mass, and more preferably from 20 to 50 parts by mass, relative to 100 parts by mass of the solution-polymerized SBR (P).

The solution-polymerized SBR (P) contains 5 mass % or greater, preferably from 5 to 40 mass %, and particularly preferably from 10 to 30 mass %, of the structural unit (p) in which three or more SBR-based polymer chains (p1) are bonded via the modifying agent (p2).

The proportion of structural unit (p) in which three or more SBR-based polymer chains (p1) are bonded via the modifying agent (p2) relative to the total amount of the solution-polymerized SBR (P) that is ultimately obtained is expressed as the "ratio of coupling of three or more branches (mass %)" (simply called "coupling ratio" hereinafter). This coupling ratio may be measured by gel permeation chromatography (GPC)(in terms of polystyrene). From the chart obtained by gel permeation chromatography measurement, the ratio (s2/s1) of the area (s2) of the peak portion having a peak top molecular weight 2.8 or more times the peak top molecular weight indicated by the peak of smallest molecular weight to the total elution area (s1) is taken as the ratio of coupling of three or more branches. Note that, when a coupling agent other than the modifying agent (p2) is added before modification, a sample is taken before the modifying agent (p2) is added, and by performing measurement using GPC, the proportion of SBR-based polymer chain bonded only to the coupling agent can be corrected.

The weight average molecular weight of the solution-polymerized SBR (P) is not particularly limited, but the value measured by gel permeation chromatography measured based on calibration with polystyrene is typically from 1,000 to 3,000,000, preferably from 100,000 to 2,000,000, and more preferably from 300,000 to 1,500,000. When the weight average molecular weight is 3,000,000 or less, blending of the silica in the solution-polymerized SBR (P) is facilitated, and superior scorch resistance of the rubber composition for tires is achieved. Furthermore, when the weight average molecular weight is 1000 or greater, the low rolling resistance of the obtained tire is superior.

The molecular weight distribution of the solution-polymerized SBR (P) which is expressed as the ratio (Mw/Mn) of the weight average molecular weight (Mw) to the number average molecular weight (Mn) is not particularly limited; however, the molecular weight distribution is preferably from 1.1 to 3.0, more preferably from 1.2 to 2.5, and particularly preferably from 1.3 to 2.2. When this molecular weight distribution (Mw/Mn) is 3.0 or less, the low rolling resistance of the obtained tire is superior.

The Mooney viscosity ($ML_{1+4}$ (100° C.)) of the solution-polymerized SBR (P) is not particularly limited, but is typically from 20 to 100, preferably from 30 to 90, and more preferably from 40 to 85. When the solution-polymerized SBR (P) is obtained as an oil-extended rubber, the Mooney viscosity of that oil-extended rubber is preferably in a range that is the same as the range described above.

Emulsion-Polymerized SBR

The emulsion-polymerized SBR contained in the diene-based blended rubber (specific emulsion-polymerized SBR) is not particularly limited as long as the styrene unit content is from 35 to 50 mass %.

The total content of the solution-polymerized SBR and the emulsion-polymerized SBR in the diene-based blended rubber is from 70 to 90 mass %.

When the total content is greater than 90 mass % in the diene-based blended rubber, wear resistance and dry performance of the resulting tire is insufficient. Furthermore, when the total content is less than 70 mass % in the diene-based blended rubber, wear resistance, wet performance, and dry performance is insufficient.

Aromatic Modified Terpene Resin

The aromatic modified terpene resin contained in the composition of the present technology is not particularly limited.

The softening point of the aromatic modified terpene resin is not particularly limited; however, the softening point is preferably from 100 to 160° C. and more preferably from 100 to 130° C.

Note that the softening point is a Vicat softening point measured in accordance with JIS (Japanese Industrial Standard) K6220-17206:1999.

In the composition of the present technology, the content of the aromatic modified terpene resin is from 1 to 25 parts by mass per 100 parts by mass of the diene-based blended rubber. Within this range, the content is preferably from 5 to 20 parts by mass.

Silica

The silica contained in the composition of the present technology is not particularly limited, and any conventionally known silica that is compounded into a rubber composition in applications such as tires can be used.

Examples of the silica include wet silica, dry silica, fumed silica, diatomaceous earth, and the like. One type of the silica may be used alone, or two or more types of the silicas may be used in combination.

The nitrogen adsorption specific surface area ($N_2SA$) of the silica is not particularly limited; however, from the perspectives of achieving superior wear resistance, wet performance, and dry performance of the resulting tire, the nitrogen adsorption specific surface area is preferably from 130 to 260 $m^2/g$ and more preferably from 200 to 260 $m^2/g$.

Note that $N_2SA$ is an alternative characteristic of the surface area that can be used for adsorption of the rubber molecules by the silica, and is an amount of the nitrogen adsorption on the silica surface measured in accordance with JIS K6217-2:2001 (Part 2: Determination of specific surface area—Nitrogen adsorption methods—Single-point procedures).

In the composition of the present technology, the content of the silica is from 80 to 150 parts by mass per 100 parts by mass of the diene-based blended rubber.

Carbon Black

The carbon black contained in the composition of the present technology is not particularly limited and, for example, carbon blacks with various grades, such as SAF-HS, SAF, ISAF-HS, ISAF, ISAF-LS, IISAF-HS, HAF-HS, HAF, HAF-LS, and FEF, can be used.

The nitrogen adsorption specific surface area ($N_2SA$) of the carbon black is not particularly limited, but is preferably from 100 to 160 $m^2/g$, and more preferably from 120 to 150 $m^2/g$.

Note that the nitrogen adsorption specific surface area ($N_2SA$) is a value of the amount of nitrogen adsorbed to a surface of carbon black, measured in accordance with JIS K6217-2:2001 (Part 2: Determination of specific surface area—Nitrogen adsorption methods—Single-point procedures).

In the composition of the present technology, the content of the carbon black is from 15 to 50 parts by mass per 100 parts by mass of the diene-based blended rubber. Within this range, the content is preferably from 20 to 50 parts by mass.

Optional Component

The composition of the present technology may further contain another additive (optional component) as necessary within the scope that does not inhibit the effect or purpose thereof.

Examples of the optional component include various additives that are typically used in rubber compositions, such as fillers, silane coupling agents, zinc oxide (flower of zinc), stearic acid, anti-aging agents, waxes, processing aids, process oils, liquid polymers, thermosetting resins, vulcanizing agents (e.g. sulfur), and vulcanization accelerators, rubber component other than the natural rubber, the solution-polymerized SBR, and the emulsion-polymerized SBR described above (e.g. butadiene rubber), and the like.

Method of Producing Rubber Composition for Tires

The method of producing the composition of the present technology is not particularly limited, and specific examples thereof include a method whereby each of the above-mentioned components is kneaded using a publicly known method and device (e.g. Banbury mixer, kneader, and roll). When the composition of the present technology contains a sulfur or a vulcanization accelerator, the components other than the sulfur and the vulcanization accelerator are preferably blended first, and cooled, and then the sulfur or the vulcanization accelerator is blended.

In addition, the composition of the present technology can be vulcanized or crosslinked under conventionally known vulcanizing or crosslinking conditions.

Pneumatic Tire

The pneumatic tire of the present technology is a pneumatic tire produced using the composition of the present technology described above. In particular, the pneumatic tire is preferably a pneumatic tire that includes the composition of the present technology in the tread portion (tire tread).

FIG. 1 is a partial cross-sectional schematic view of a tire that represents one embodiment of the pneumatic tire of the present technology, but the pneumatic tire of the present technology is not limited to the embodiment illustrated in FIG. 1.

In FIG. 1, reference sign 1 indicates a bead portion, reference sign 2 indicates a sidewall portion, and reference sign 3 indicates a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire circumference of the tire on the outer side of the carcass layer 4.

Additionally, rim cushions 8 are provided in parts of the bead portions 1 that are in contact with a rim.

The pneumatic tire of the present technology can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

Hereinafter, the present technology will be further described in detail with reference to examples; however, the present technology is not limited thereto.

Production of Solution-Polymerized SBR

In a nitrogen-purged 100 mL ampoule bottle, 28 g of cyclohexane and 8.6 mmol of tetramethylethylenediamine were added, and then 6.1 mmol of n-butyllithium was further added. Then, 8.0 g of isoprene was slowly added, and the mixture was reacted for 120 minutes in the 60° C. ampoule bottle to yield isoprene block (used as initiator 1). The weight average molecular weight, molecular weight distribution, and isoprene unit-derived vinyl bond content of this initiator 1 were measured. The measurement results are shown in Table 1.

Then, in a nitrogen atmosphere in an autoclave equipped with a stirrer, 4000 g of cyclohexane, 357.7 g of 1,3- butadiene, and 132.3 g of styrene were loaded, and then the total amount of initiator 1 was added, and polymerization of the mixture was initiated at 40° C. Ten minutes after polymerization was initiated, 195.3 g of 1,3-butadiene and 14.7 g of styrene were continuously added over the course of 60 minutes. The maximum temperature during the polymerization reaction was 60° C. After continuous addition was completed, the polymerization reaction was continued for another 20 minutes, and after it was confirmed that the polymer conversion rate had reached from 95 to 100%, 0.08 mmol of 1,6-bis(trichlorosilyl)hexane was added in the state of a cyclohexane solution having a 20 mass % concentration, and the mixture was reacted for 10 minutes. Furthermore, 0.027 mmol of the polyorganosiloxane A represented by Formula (9) below was added in the state of a xylene solution having a 20 mass % concentration, and the mixture was reacted for 30 minutes. After that, methanol in an amount equivalent to twice the number of moles of n-butyllithium used was added as a polymerization terminator, and a solution containing a solution-polymerized SBR was obtained. The solvent in the obtained solution was then removed by steam stripping and vacuum drying at 60° C. for 24 hours to obtain a solution-polymerized SBR. Furthermore, 25 parts by mass of an extender oil was added per 100 parts by mass of the obtained solution-polymerized SBR to obtain a solution-polymerized SBR (oil extended product).

Note that the obtained solution-polymerized SBR corresponded to the solution-polymerized SBR (P) described above and contained the specific solution-polymerized SBR having a block containing an isoprene unit at one terminal thereof and a terminal having a polyorganosiloxane structure, as a modified terminal for silica, at the other terminal thereof

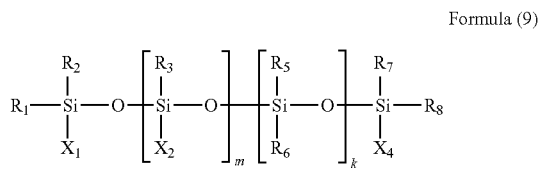

Formula (9)

In Formula (9) above, each of $X_1$, $X_4$, $R_1$ to $R_3$, and $R_5$ to $R_8$ is a methyl group. In Formula (9) above, m is 80, and k is 120. In Formula (9) above, $X_2$ is a group represented by Formula (10) below (in Formula (10), * indicates a bond position).

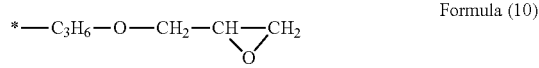

Formula (10)

For the obtained solution-polymerized SBR, the weight average molecular weight, molecular weight distribution, coupling ratio, styrene unit content in the portions other than the isoprene block, vinyl bond content in the portions other than the isoprene block, and Mooney viscosity were measured. The measurement results are shown in Table 2. The measurement method is as follows.

Weight Average Molecular Weight, Molecular Weight Distribution, and Coupling Ratio The weight average molecular weight, molecular weight distribution, and coupling ratio (proportion of structural unit (p) relative to solution-polymerized SBR (P) (mass %)) were determined based on a chart obtained by gel permeation chromatography based on molecular weight measured based on calibration with polystyrene. The specific gel permeation chromatography measurement method is as follows.

Measurement instrument: HLC-8020 (manufactured by Tosoh Corp.)

Column: GMH-HR-H (manufactured by Tosoh Corp.), two connected in serial

Detector: Differential refractometer RI-8020 (manufactured by Tosoh Corp.)

Eluent: Tetrahydrofuran

Column temperature: 40° C.

Here, the coupling ratio is the ratio (s2/s1) of the area (s2) of the peak portion having a peak top molecular weight 2.8 or more times the peak top molecular weight indicated by the peak of smallest molecular weight to the total elution area (s1).

Styrene Unit Content and Vinyl Bond Content

The styrene unit content and vinyl bond content were measured by $^1$H-NMR.

Mooney Viscosity

Mooney viscosity ($ML_{1+4}$ (100° C.)) was measured in accordance with JIS K6300-1:2001.

TABLE 1

|  | Initiator 1 |
| --- | --- |
| Weight average molecular weight (×10$^4$) | 0.22 |
| Vinyl bond content (wt. %) | 72.3 |
| Molecular weight distribution (Mw/Mn) | 1.08 |

TABLE 2

|  | Solution-polymerized SBR |
| --- | --- |
| Styrene unit content (wt. %) | 21.0 |
| Vinyl bond content (wt. %) | 63.3 |
| Weight average molecular weight (×10$^4$) | 43.5 |
| Molecular weight distribution (Mw/Mn) | 1.46 |
| Coupling ratio of three or more branches (wt. %) | 25.0 |
| Mooney viscosity | 58.0 |

Preparation of Rubber Composition for Tires

The components shown in Table 3 below were blended in the proportions (part by mass) shown in Table 3 below.

Specifically, a master batch was obtained by mixing the components shown in Table 3, excluding the sulfur and the vulcanization accelerator for 5 minutes in a 1.7 L closed-type Banbury mixer heated to a temperature near 150° C., and then discharging the mixture and cooling it to room temperature. The sulfur and vulcanization accelerator were then mixed into the resulting master batch using the Banbury mixer described above so as to obtain a rubber composition for tires.

Manufacture of Vulcanized Rubber Sheet for Evaluation

A vulcanized rubber sheet was manufactured by press-vulcanizing the prepared (unvulcanized) rubber composition for tires for 20 minutes at 160° C. in a mold (15 cm×15 cm×0.2 cm).

Evaluation of Wear Resistance

For the vulcanized rubber sheet produced as described above, abrasion loss was measured in accordance with JIS K6264-1 2:2005 using a Lambourn abrasion tester (manufactured by Iwamoto Seisakusho Co. Ltd.) at a temperature of 20° C. and at a slip ratio of 50%.

The results are shown in Table 3 (wear resistance). The results are shown as index values obtained by the following formula, with the amount of wear of Comparative Example 1 expressed as 100. A higher index value indicates a smaller amount of wear, which indicates excellent wear resistance when a tire is formed.

Wear resistance=(amount of wear of Comparative Example 1/amount of wear of sample)×100

Evaluation of Wet Performance

Pneumatic tires were produced using the obtained rubber composition for tires (tire size: 225/50R17). The obtained pneumatic tires were then fitted to wheels having rim sizes of 7×J, the wheels were mounted on a 2.5 liter class vehicle made in Japan, and the wet grip performance was measured in accordance with the EU Test Method for Tyre Wet Grip Grading (C1 Types). The obtained results are shown on the "wet performance" row of Table 3, with the value of Comparative Example 1 expressed as an index of 100. Greater wet performance index values indicate superior wet grip performance.

Evaluation of Dry Performance

Pneumatic tires were produced using the obtained rubber composition for tires (tire size: 225/50R17). The obtained pneumatic tires were then fitted to wheels having rim sizes of 7×J, the wheels were mounted on a 2.5 liter class vehicle made in Japan, and the vehicle is used as a vehicle for the evaluation.

The braking distance for the case where sudden braking was applied at a speed of 100 km/h on a dry road surface was measured. The reciprocals of the braking distances are shown in Table 3 (dry performance). The results are shown as index values with the reciprocal of the braking distance of Comparative Example 1 expressed as an index of 100. Larger index values indicate smaller braking distances on the dry road surface and excellent dry performances.

Evaluation of Low Rolling Resistance

For the vulcanized rubber sheet produced as described above, tan δ (60° C.) was measured using a viscoelastic spectrometer (manufactured by Iwamoto Seisakusho Co. Ltd.) in accordance with JIS K6394:2007 under the following conditions: a strain of tensile deformation of 10%±2%; a frequency of 20 Hz; and a temperature of 60° C.

The reciprocals of tan δ (60° C.) are shown in Table 3 (low rolling resistance). The results are shown as index values with the reciprocal of tan δ (60° C.) of Comparative Example 1 expressed as an index of 100. Larger index values indicate smaller tan δ (60° C.) values, which in turn indicate excellent low rolling resistance when a tire is formed.

TABLE 3

|  | Comparative Example 1 | Working Example 1 | Working Example 2 |
|---|---|---|---|
| Natural rubber | 15 | 15 | 15 |
| Solution-polymerized SBR | — | 53.1 (42.5) | 25.0 (20.0) |
| Solution-polymerized SBR for comparison | 58.4 (42.5) | — | — |
| Emulsion-polymerized SBR | 58.4 (42.5) | 58.4 (42.5) | 89.4 (65.0) |
| Emulsion-polymerized SBR for comparison | — | — | — |
| Silica 1 | 100.0 | 100.0 | 100.0 |
| Silica 2 | — | — | — |
| Carbon black | 20.0 | 20.0 | 20.0 |
| Silane coupling agent | 8.0 | 8.0 | 8.0 |
| Aromatic modified terpene resin | 15.0 | 15.0 | 15.0 |
| Oil | 30.0 | 35.0 | 32.0 |
| Zinc oxide | 3 | 3 | 3 |
| Stearic acid | 2 | 2 | 2 |
| Anti-aging agent | 3 | 3 | 3 |
| Sulfur | 1.0 | 1.0 | 1.0 |
| Vulcanization accelerator 1 | 2.0 | 2.0 | 2.0 |
| Vulcanization accelerator 2 | 1.8 | 1.8 | 1.8 |
| Wear resistance | 100 | 105 | 103 |
| Wet performance | 100 | 105 | 103 |
| Dry performance | 100 | 103 | 105 |
| Low rolling resistance | 100 | 105 | 101 |

|  | Working Example 3 | Working Example 4 | Working Example 5 |
|---|---|---|---|
| Natural rubber | 15 | 15 | 15 |
| Solution-polymerized SBR | 81.3 (65.0) | 53.1 (42.5) | 53.1 (42.5) |
| Solution-polymerized SBR for comparison | — | — | — |
| Emulsion-polymerized SBR | 27.5 (20.0) | 58.4 (42.5) | 58.4 (42.5) |
| Emulsion-polymerized SBR for comparison | — | — | — |
| Silica 1 | 100.0 | — | 80.0 |
| Silica 2 | — | 100.0 | — |
| Carbon black | 20.0 | 20.0 | 40.0 |
| Silane coupling agent | 8.0 | 8.0 | 6.4 |
| Aromatic modified terpene resin | 15.0 | 15.0 | 15.0 |
| Oil | 38.0 | 35.0 | 35.0 |
| Zinc oxide | 3 | 3 | 3 |
| Stearic acid | 2 | 2 | 2 |
| Anti-aging agent | 3 | 3 | 3 |
| Sulfur | 1.0 | 1.0 | 1.5 |
| Vulcanization accelerator 1 | 2.0 | 2.0 | 2.0 |
| Vulcanization accelerator 2 | 1.8 | 1.8 | 1.8 |
| Wear resistance | 108 | 110 | 113 |
| Wet performance | 108 | 110 | 103 |
| Dry performance | 102 | 105 | 108 |
| Low rolling resistance | 108 | 103 | 102 |

|  | Comparative Example 2 | Comparative Example 3 | Comparative Example 4 |
|---|---|---|---|
| Natural rubber | 15 | 8 | 35 |
| Solution-polymerized SBR | 53.1 (42.5) | 57.5 (46.0) | 40.6 (32.5) |
| Solution-polymerized SBR for comparison | — | — | — |
| Emulsion-polymerized SBR | — | 63.3 (46.0) | 44.7 (32.5) |
| Emulsion-polymerized SBR for comparison | 58.4 (42.5) | — | — |
| Silica 1 | 100.0 | 100.0 | 100.0 |
| Silica 2 | — | — | — |
| Carbon black | 20.0 | 20.0 | 20.0 |
| Silane coupling agent | 8.0 | 8.0 | 8.0 |
| Aromatic modified terpene resin | 15.0 | 15.0 | 15.0 |
| Oil | 35.0 | 33.0 | 35.0 |
| Zinc oxide | 3 | 3 | 3 |
| Stearic acid | 2 | 2 | 2 |
| Anti-aging agent | 3 | 3 | 3 |
| Sulfur | 1.0 | 1.0 | 1.0 |
| Vulcanization accelerator 1 | 2.0 | 2.0 | 2.0 |
| Vulcanization accelerator 2 | 1.8 | 1.8 | 1.8 |
| Wear resistance | 103 | 98 | 100 |
| Wet performance | 95 | 105 | 90 |
| Dry performance | 95 | 98 | 90 |
| Low rolling resistance | 107 | 105 | 102 |

|  | Comparative Example 5 | Comparative Example 6 |
|---|---|---|
| Natural rubber | 15 | 15 |
| Solution-polymerized SBR | 106.3 (85.0) | 53.1 (42.5) |
| Solution-polymerized SBR for comparison | — | — |
| Emulsion-polymerized SBR | — | 58.4 (42.5) |

TABLE 3-continued

| | | |
|---|---|---|
| Emulsion-polymerized SBR for comparison | — | — |
| Silica 1 | 100.0 | 100.0 |
| Silica 2 | — | — |
| Carbon black | 20.0 | 20.0 |
| Silane coupling agent | 8.0 | 8.0 |
| Aromatic modified terpene resin | 15.0 | — |
| Oil | 40.0 | 35.0 |
| Zinc oxide | 3 | 3 |
| Stearic acid | 2 | 2 |
| Anti-aging agent | 3 | 3 |
| Sulfur | 1.0 | 1.0 |
| Vulcanization accelerator 1 | 2.0 | 2.0 |
| Vulcanization accelerator 2 | 1.8 | 1.8 |
| Wear resistance | 99 | 105 |
| Wet performance | 106 | 98 |
| Dry performance | 98 | 96 |
| Low rolling resistance | 110 | 107 |

| | Comparative Example 7 | Comparative Example 8 |
|---|---|---|
| Natural rubber | 15 | 15 |
| Solution-polymerized SBR | 53.1 (42.5) | 53.1 (42.5) |
| Solution-polymerized SBR for comparison | — | — |
| Emulsion-polymerized SBR | 58.4 (42.5) | 58.4 (42.5) |
| Emulsion-polymerized SBR for comparison | — | — |
| Silica 1 | 110.0 | 70.0 |
| Silica 2 | — | — |
| Carbon black | 10.0 | 50.0 |
| Silane coupling agent | 8.8 | 5.6 |
| Aromatic modified terpene resin | 15.0 | 15.0 |
| Oil | 35.0 | 35.0 |
| Zinc oxide | 3 | 3 |
| Stearic acid | 2 | 2 |
| Anti-aging agent | 3 | 3 |
| Sulfur | 1.0 | 1.5 |
| Vulcanization accelerator 1 | 2.0 | 2.0 |
| Vulcanization accelerator 2 | 1.8 | 1.8 |
| Wear resistance | 101 | 114 |
| Wet performance | 107 | 101 |
| Dry performance | 99 | 109 |
| Low rolling resistance | 107 | 95 |

The details of each component shown in Table 3 above are as follows.

Natural rubber: SIR-20

Solution-polymerized SBR: Solution-polymerized SBR produced as described above (solution-polymerized SBR corresponding to the solution-polymerized SBR (P) described above and contains the specific solution-polymerized SBR having a block containing an isoprene unit at one terminal thereof and a terminal having a polyorganosiloxane structure, as a modified terminal for silica, at the other terminal thereof)

Solution-polymerized SBR for comparison: E581 (oil extended product (37.5 parts by mass of extender oil was contained per 100 parts by mass of SBR; net amount of SBR in the SBR: 72.7 mass %) styrene unit content: 37 mass %; vinyl bond content 43%; manufactured by Asahi Kasei Corporation)

Emulsion-polymerized SBR: Nipol 9548 (oil extended product (37.5 parts by mass of extender oil was contained per 100 parts by mass of SBR; net amount of SBR in the SBR: 72.7 mass %) styrene unit content: 37 mass %; vinyl bond content 13%; manufactured by Zeon Corporation) (emulsion-polymerized SBR corresponding to the specific emulsion-polymerized SBR described above)

Emulsion-polymerized SBR for comparison: Nipol 1723 (oil extended product (37.5 parts by mass of extender oil was contained per 100 parts by mass of SBR; net amount of SBR in the SBR: 72.7 mass %) styrene unit content: 25 mass %; vinyl bond content 15%; manufactured by Zeon Corporation)

Silica 1: Zeosil 1165MP ($N_2SA$: 160 $m^2/g$, manufactured by Rhodia)

Silica 2: Zeosil Premium 200MP ($N_2SA$: 210 $m^2/g$, manufactured by Rhodia)

Carbon black: Show Black N234 (manufactured by Cabot Japan K.K.)

Silane coupling agent: Si69 (bis(3-triethoxysilylpropyl) tetrasulfide; manufactured by Evonik Degussa)

Aromatic modified terpene resin: YS Resin TO-125 (aromatic modified terpene resin; softening point: 125° C.; manufactured by Yasuhara Chemical Co., Ltd.)

Oil: Extract No. 4S (manufactured by Showa Shell Sekiyu K.K.)

Zinc oxide: Zinc Oxide III (manufactured by Seido Chemical Industry Co., Ltd.)

Stearic acid: Industrial stearic acid N (manufactured by Chiba Fatty Acid Co., Ltd.)

Anti-aging agent: OZONONE 6C (manufactured by Seiko Chemical Co., Ltd.)

Sulfur: "Golden Flower" oil-treated sulfur powder (manufactured by Tsurumi Chemical Industry Co., Ltd.)

Vulcanization accelerator 1: NOCCELER CZ-G (manufactured by Ouchi Shinko Chemical Industrial Co., Ltd.)

Vulcanization accelerator 2: PERKACIT DPG (manufactured by Flexsys)

As is clear from Table 3, all of working examples of the present application, which contained the natural rubber, the diene-based blended rubber containing the solution-polymerized SBR containing the specific solution-polymerized SBR and the specific emulsion-polymerized SBR, the aromatic modified terpene resin, the silica, and the carbon black, exhibited excellent wear resistance, wet performance, dry performance, and low rolling resistance. Among these, Working Example 4, in which $N_2SA$ of the silica was 200 $m^2/g$ or greater, exhibited even better wear resistance, wet performance, and dry performance.

From the comparison of Working Examples 1 to 3, Working Examples 1 and 3, in which the content of the solution-polymerized SBR in the diene-based blended rubber was 30 mass % or greater, exhibited excellent wear resistance and wet performance. Among these, Working Example 3, in which the content of the solution-polymerized SBR in the diene-based blended rubber was 50 mass % or greater, exhibited even better wear resistance and wet performance.

From the comparison of Working Examples 1 to 5, Working Example 5, in which the content of the carbon black was 30 parts by mass or greater per 100 parts by mass of the diene-based blended rubber, exhibited even better wear resistance and dry performance.

On the other hand, Comparative Example 1, which contained the solution-polymerized SBR but did not contain a specific solution-polymerized SBR, exhibited insufficient wear resistance, wet performance, and dry performance. Furthermore, Comparative Example 2, which contained the emulsion-polymerized SBR but did not contain a specific emulsion-polymerized SBR, exhibited insufficient wet performance and dry performance.

Furthermore, Comparative Example 3, which contained the natural rubber, the diene-based blended rubber containing the solution-polymerized SBR containing the specific solution-polymerized SBR and the specific emulsion-polymerized SBR, the aromatic modified terpene resin, the silica, and the carbon black, but only contained less than 10 mass % of the natural rubber content in the diene-based blended rubber exhibited insufficient wear resistance and dry performance. Comparative Example 4, in which the content of the natural rubber in the diene-based blended rubber was greater than 30 mass % although each component was similarly contained, exhibited insufficient wear resistance, wet performance, and dry performance.

Furthermore, Comparative Example 5, which contained no emulsion-polymerized SBR, exhibited insufficient wear resistance and dry performance.

Furthermore, Comparative Example 6, which contained no aromatic modified terpene resin, exhibited insufficient wet performance and dry performance.

Furthermore, Comparative Example 7, in which the content of the carbon black was less than 15 parts by mass per 100 parts by mass of the diene-based blended rubber, exhibited insufficient dry performance.

Furthermore, Comparative Example 8, in which the content of the silica was less than 80 parts by mass per 100 parts by mass of the diene-based blended rubber, exhibited insufficient wet performance and low rolling resistance.

The invention claimed is:

1. A rubber composition for tires comprising: a diene-based blended rubber containing a natural rubber, a solution-polymerized styrene-butadiene rubber and an emulsion-polymerized styrene-butadiene rubber, an aromatic modified terpene resin, a silica, and a carbon black;
   the solution-polymerized styrene-butadiene rubber containing a specific solution-polymerized styrene-butadiene rubber having a block containing an isoprene unit at one terminal thereof and a modified terminal for silica at another terminal thereof;
   a styrene unit content of the emulsion-polymerized styrene-butadiene rubber being from 35 to 50 mass %;
   a content of the natural rubber in the diene-based blended rubber being from 10 to 30 mass %;
   a total content of the solution-polymerized styrene-butadiene rubber and the emulsion-polymerized styrene-butadiene rubber in the diene-based blended rubber being from 70 to 90 mass %;
   a content of the aromatic modified terpene resin being from 1 to 25 parts by mass per 100 parts by mass of the diene-based blended rubber;
   a content of the silica being from 80 to 150 parts by mass per 100 parts by mass of the diene-based blended rubber; and
   a content of the carbon black being from 15 to 50 parts by mass per 100 parts by mass of the diene-based blended rubber.

2. The rubber composition for tires according to claim 1, wherein the silica has a nitrogen adsorption specific surface area ($N_2SA$) of 200 to 260 $m^2/g$.

3. The rubber composition for tires according to claim 1, wherein the silica has a nitrogen adsorption specific surface area ($N_2SA$) of 130 to 260 $m^2/g$.

4. The rubber composition for tires according to claim 3, wherein the silica has a nitrogen adsorption specific surface area ($N_2SA$) of 200 to 260 m2/g.

5. The rubber composition for tires according to claim 1, wherein the modified terminal for silica has at least one type of group selected from the group consisting of epoxy groups and hydrocarbyloxysilyl groups.

6. The rubber composition for tires according to claim 5, wherein the silica has a nitrogen adsorption specific surface area ($N_2SA$) of 130 to 260 m2/g.

7. The rubber composition for tires according to claim 5, wherein the silica has a nitrogen adsorption specific surface area ($N_2SA$) of 200 to 260 m2/g.

8. A pneumatic tire comprising a tread portion formed by using the rubber composition for tires described in claim 1.

9. A pneumatic tire comprising a tread portion formed by using the rubber composition for tires described in claim 2.

10. A pneumatic tire comprising a tread portion formed by using the rubber composition for tires described in claim 3.

11. A pneumatic tire comprising a tread portion formed by using the rubber composition for tires described in claim 4.

12. A pneumatic tire comprising a tread portion formed by using the rubber composition for tires described in claim 5.

13. A pneumatic tire comprising a tread portion formed by using the rubber composition for tires described in claim 6.

14. A pneumatic tire comprising a tread portion formed by using the rubber composition for tires described in claim 7.

15. A pneumatic tire comprising a tread portion formed by using the rubber composition for tires described in claim 12.

* * * * *